March 28, 1967 A. HUNTER 3,311,370

SELECTIVE RECORD CARD ADVANCING MECHANISM

Filed April 5, 1965

INVENTOR
ALEXANDER HUNTER

BY

ATTORNEY

United States Patent Office 3,311,370
Patented Mar. 28, 1967

3,311,370

SELECTIVE RECORD CARD ADVANCING MECHANISM

Alexander Hunter, Chalfont, Pa., assignor to Sperry Rand Corporation, New York, N.Y., a corporation of Delaware Filed Apr. 5, 1965, Ser. No. 445,611
7 Claims. (Cl. 271—54)

This invention pertains to a selective record advancing mechanism and more particularly, to a mechanism for maintaining a record card adjacent an operating station and for selectively initiating the movement of said record card through said operating station.

As is well known in the record card handling arts, a summary punch is a device for punching the results of a tabulating operation onto the record cards which carried a portion of the input data for the tabulator or onto further record cards. These records cards are normally maintained in a remotely located record card reading device or a remotely located record card hopper. In either instance, it is necessary to advance the required record cards from such remotely located mechanisms to the summary punch when the summary punch is ready to punch out the results of the tabulator operation. The length of time required for the record card to be presented to the summary punch will depend upon the distance between the summary punch and the record card reader or hopper as well as the length of time required by the reader or hopper to respond to a command to advance a record card to the summary punch. As the speed of operation of summary punching devices is increased, the largest portion of the time required to process a single record card, is the command response time and the transit time of the record card from the reader or hopper to the summary punch. A similar problem exists with record card reading devices, where the record card is maintained in a visible station prior to being passed to the reading head. Much time is wasted waiting for the mechanism to advance a record card from the visible station to the read head to respond and for the time the record card is in transit.

The present invention overcomes the difficulties set out above with prior art summary punch devices and record card reading devices as now employed. The present invention makes use of a selective card advancing mechanism mounted adjacent the operating station which can retain a record card in close proximity thereto and advance the record card therethrough with little loss of time. Record cards are inserted within the card advancing mechanism which is placed in a condition whereby it is not possible to advance the record card into said operating station. Upon a command from the operating station indicating that such a record card is required, the record card advancing mechanism is placed in a second condition to advance the record card an extremely short distance into the operating station. The present invention includes a shield member placed intermediate said record card and the pusher blades of said record card advancing mechanism whereby the pusher blades are prevented from striking the trailing edge of the record card contained in said record card advancing mechanism. The record card continues to idle in said mechanism as long as said shield member remains in its place. Upon command from the operating station, the shield member is withdrawn and the pusher blades are allowed to strike the trailing edge of the record card in said record card advancing mechanism and advance the record card into the operating station in a series of controlled incremental steps.

It is therefore an object of this invention to provide a selectively operable record card advancing mechanism.

It is another object of this invention to provide a record card advancing mechanism capable of maintaining a record card adjacent an operating station and selectively initiating the advancing of said record card through said operating station.

It is still another object of this invention to provide a record card advancing mechanism wherein certain of the record card advancing elements are shielded from said record card and the advancement of said record card is prevented until said certain record card advancing elements are unshielded.

It is still another object of this invention to provide a selectively operable shield member in a record card advancing mechanism whereby said shield member when in a first position will prevent contact between certain record card advancing elements of said record card advancing mechanism and a record card inserted in said record card advancing mechanism and when said shield member is placed in a second position will permit contact between said certain record card advancing elements and said record card to advance said record card through an adjacent operating station in a series of incremental steps.

Further objects and features of the invention will be pointed out in the following description and claims, and illustrated in the accompanying drawings, which disclose, by way of example, the principles of the invention and the best modes which have been contemplated for carrying it out.

In the drawings.

Similar elements are given similar reference characters in each of the respective figures.

Figure 1:
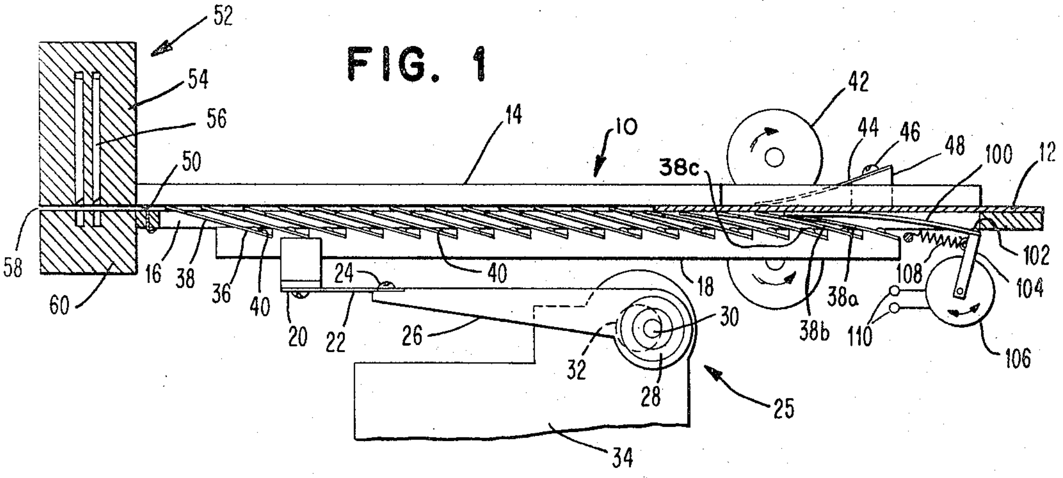
FIGURE 1 is a side view in partial section of a record card advancing mechanism, constructed in accordance with the basic concepts of this invention, and illustrating a record card entering the record card advancing mechanism, and illustrating the shield member in the shielding position.

Referring now to FIGURE 1 there is shown a side view of a record card advancing mechanism 10 of the present invention including its associated punching equipment and illustrating the relative position of a record card 12 (shown in section) as it enters the record card advancing mechanism 10. The record card advancing mechanism 10 consists of an upper guide plate 14 which is fixedly mounted to the frame or side wall of a record handling apparatus (not shown). Spaced apart from the upper guide plate 14 is a lower guide plate 16 also fixedly mounted to the frame or side wall of the record card handling apparatus.

A further support member 18 is arranged for reciprocal movement in first and second directions toward and away from the left hand margin of the figure. The first direction of movement is towards the operating or punch station and will be referred to as forward movement whereas the second direction of movement is away from the operating or punch station and will be referred to as rearward movement. The support member 18 is reciprocated in said forward and rearward directions by means of an eccentric assembly 25. The eccentric assembly consists of an arm 26 having mounted near one end an enclosed bearing housing 28 coupled by an eccentric pin 30 to a shaft 32. The shaft 32 is journalled in a bearing in a supporting member 34, which is in turn affixed to the frame or side wall of the record card handling apparatus. Due to the eccentric mounting of the pin 30 on the shaft 32, the arm 26 will be caused to move in an essentially elliptical path reciprocating between two fixed limits set to be the length of desired movement of the record card advancing mechanism. The essentially elliptical motion of the arm 26 will be translated by means of a flexure spring 22 coupled to arm 26 by fastener 24 into essentially linear reciprocal motion. As a result the supporting member 18 coupled to flexure spring 22 by fastener 20 will be moved in its opposite directions in an essentially linear fashion.

Arranged along the upper surface of the support member 18 are a plurality of ridges 36 corresponding in number to the number of record card advancing positions required. For example, if it is desired to move a record card through a punching device in a series of forty equal incremental steps there would be forty of these ridges 36 disposed along the length of the support member 18, each of which is spaced by a distance equal to the desired incremental step. Coupled to each of the ridges by means of fasteners 40, is a flexure pusher blade 38. Each of the pusher blades 38 protrudes through an aperture 17 (visible in FIGURE 2) in the lower guide plate 16, in such a manner that the free edge of each of the pusher blades 38 is able to contact the upper guide member 14. The aperture 17 is of sufficient length that it will not impede the movement of the pusher blades 38 when reciprocated.

The record card 12 is moved to the record card advance mechanism 10 by means of feed rolls (not shown) and is advanced into the record card advancing mechanism by further feed rolls 42. The feed rolls 42 consist of a pair of upper feed rolls and a further pair of lower feed rolls mounted respectively above and below the path of the record card 12. The back feed rolls 42 of the pairs are shown in the figure while the forward feed rolls 42 are not shown in order not to obscure the remaining mechanism of the record card advancing mechanism 10. The feed rolls 42 may be driven by a motor source (not shown). The feed rolls 42 will continue to advance the record card 12 into the record card advancing mechanism 10 until the trailing edge of the record card 12 is at a point between the first and second of the pusher blades **38*a* and 38*b*. In such a position, the next forward motion of the support member 18 can cause the free edge of the pusher blade 38*a* to strike the trailing edge of the record card 30** and cause it to be advanced.

It should be noted, that each of the pusher blades is of a sufficient length such that the introduction of a record card 12 at its free end does not cause the pusher blade to be bent but rather to be deflected away from the upper guide plate 14. The free edges of the pusher blades 38 when contacting the record card 12 exert sufficient force upon the under-surface of the record card 12 to cause its upper surface to be held in intimate contact with the surface of the upper guide plate 14.

Additional mechanism for controlling the position of the record card 12 within the record card advancing mechanism 10 are also employed. The first of these is a set of spring restraining means 44 coupled by means of the fasteners 46 to a block 48 attached to the frame or side wall of the record card handling apparatus. Although only the rear restraining means 44 is shown in FIGURE 1, it should be understood that a further such spring restraining means 44 is found on the side of the record card adjacent the front feed roll 42 of the upper pair. The positioning of the second spring restraining means 44 as well as that of the second feed roll 42 will be more evident from an inspection of FIGURE 2 to be discussed below. The purpose of the spring restraining means 44 is to hold the record card 12 in proper position prior to the first advancement of the record card. This will insure that the trailing edges of the record card are accurately positioned and held flat to avoid the possibility of jam or missing of the trailing edge by the first pusher blade **38*a*. After the record card has been advanced one position, that is, one incremental step, the spring restraining means 44** will no longer be effective to control the record card movement.

A further set of spring restraining means 50 mounted on the lower guide plate 16 are located at the end of the lower guide plate 16 close to the point of entry into the record card punching mechanism 52. The spring restraining members 50, of which there are two (one as shown in FIGURE 1 and a second on the opposite side of the lower guide member 16 not visible in this figure), provide sufficient force upon record cards 12 to prevent such record cards from being moved towards the punching mechanism a distance in excess of that desired. The spring restraining means 50 also exert sufficient pressure upon record cards 12 to hold them in engagement with the upper guide plate 14. This pressure is not sufficient to resist the effects of the driving force of the pusher blades 38 when advancing the record card in the desired direction. Further as the support member 18 and the pusher blades 38 are moved in a rearward direction, the spring restraining means 50 will exert sufficient pressure upon the record card 12 holding it against the surface of the upper guide member 14 to prevent its movement with the pusher blade assembly.

The punch mechanism 52 consists of punch block 54 (shown in section) in which are mounted a plurality of punch bars 56 in two columns driven by actuator means (not shown). The punch bars 56 will be driven through the record card path 58 within the punch mechanism into a punch die 60 (shown in section). A record card 12 placed within the record card path 58 will be punched in two columns in accordance with the punch bars 58 selected.

Interposed intermediate the first pusher blade **38*a* and the record card 12, is a selectively positionable shield member 100. When the shield member 100 is in the shielding position, as shown in FIGURE 1, it is not possible for the pusher blade 38*a* to strike the trailing edge of the record card 12 to advance it. The record card 12 will remain in an idling condition held against the upper guide plate 14 by the spring restraining means 50 and against the lower guide plate 16 by the spring restraining means 44, despite the continuous movement of the pusher blades 38 under control of the supporting member 18. The shield member 100 is coupled by fastener 102 to the armature 104 of a rotary solenoid 106. The armature 104 is also coupled by means of a return spring 108 to the frame or side wall of the record handling apparatus. Rotary solenoid 106 is arranged for rotation of approximately 25° which is sufficient to move the shield member 100 from the shielding position at 0° to the unshielding position at 25°. A signal to operate the solenoid 106, may be applied to the input terminals 110. Once the operating signal is removed, the return spring which had been tensed by rotation of the armature 104, will reposition the armature to the 0° and return the shield member 100 to the shielding position. The shield member is made long enough to shield the pusher blade 38*a* from the trailing edge of the record card 12 regardless of the blade's position with respect to its maximum forward movement. The shield member may be made longer to shield more pusher blades 38 than only the first pusher blade 38*a***, if desired.

Figure 2:
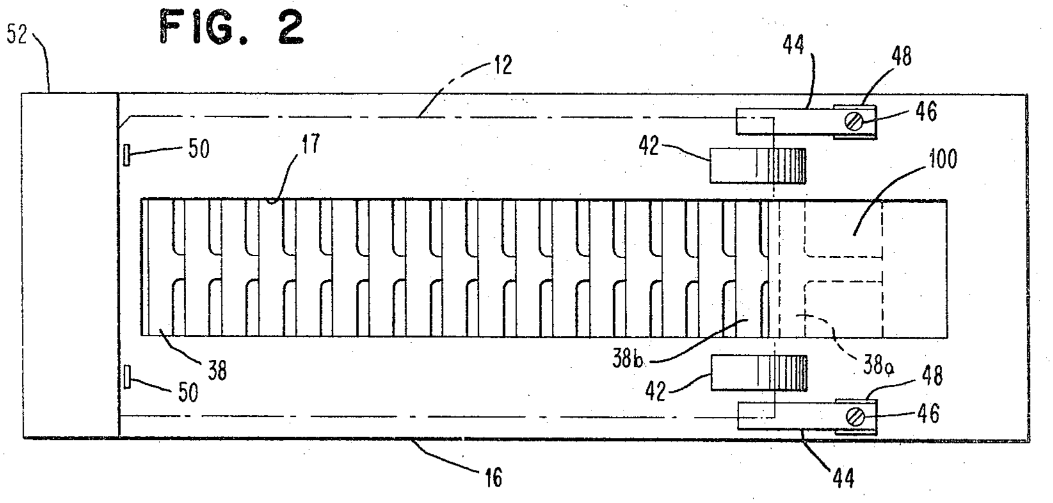
FIGURE 2 is a top view of the record card advancing mechanism as shown in FIGURE 1 with certain portions removed, illustrating in phantom the record card fully within the mechanism and illustrating the pusher blades in the maximum advance position.

Turning now to FIGURE 2, a plan view of the mechanism as described with respect to FIGURE 1 is shown. To permit a better understanding of the placement of the various elements of FIGURE 1, the upper guide plate 14 is not depicted in FIGURE 2. A record card 12 is shown in phantom line so that the mechanisms below it may be visible and to permit an understanding of the relative position of the record card 12 with respect to the record card advancing mechanism 10. The record card 12 is shown in the fully engaged position prior to first card advance. The record card 12 is shown in its position upon the lower guide plate 16 and with its trailing edge in line with the central axis of the feed rolls 42 and in the interspace between the first and second pusher blades 38*a* and 38*b*. It is assumed, that the pusher blades 38 have been moved to their extreme left most position by means of the eccentric mechanism 25, that is with shaft 32 and the pin 30 in the positions directly opposite to those indicated in FIGURE 1. In addition, it should be noted, that the spring restraining means 44 contact the record card 12. The spring restraining elements 50 are shown engaging the area of the record card 12 close to the leading edge of the record card 12. The record card leading edge, as can be seen from FIGURE 2, is already partially within the punch block 54 of the punch mechanism 52. With this arrangement, the punch block itself is also used to control the leading edge of the record card 12 and insure proper guiding thereof during the ensuing record card advance cycles.

The operation of the device can now be understood by tracing the movement of a record card 12 through the card advancing mechanism 10. The record card 12 is introduced by means of feed rolls from a hopper or visible station to the right and not visible in the figure. The record card 12 will enter the interspace between the upper guide plate 14 and the lower guide plate 16. The control of the movement of the record card 12 into the interspace is controlled by means of the feed rolls 42 which will move the record card until the trailing edge thereof is at the axial point of the feed rolls 42 at which time the feed rolls no longer control the movement of the record card 12. As the record card 12 is advanced within the interspace between the guide members 14 and 16, the weight of the card and the drive force exerted on it will cause some deflection of the pusher blades 38 away from their normal position. The relative difference of position may be determined from a comparison between the pusher blades 38 to the left of FIGURE 1 not in contact with the record card 12 and those which are at the right of the figure and in contact with the record card 12. Each of the pusher blades 38 which is in contact with a record card 12 will exert a force against the record card 12 causing it to be in contact with the upper guide member 14. During the entire time that the record card 12 is being advanced into the record card advancing mechanism 10, the support member 18 along with the pusher blades 38, attached thereto, is being reciprocated in the forward and rearward directions. Due to the long length of the individual pusher bars 38 and their ability to deflect when in contact with the record card 12, their motion will have little effect upon the motion of the record card 12 under control of the feed rolls 42 into the record card advancing mechanism 10.

At such time as a record card 12 has been completely placed within the record card advancing mechanism 10 and occupies the position as shown in FIGURE 2, that is with the area close to the trailing edge engaged by the spring restraining means 44, the leading edges engaged by the spring restraining means 50, the leading edge entered within the punch mechanism 52 and the trailing edge adjacent the center line of the feed rolls 42 and between the pusher blades 40*a* and 40*b*, the further advance of the record card 12 is taken from the control of the feed rolls 42 and put under control of the pusher blades 38 themselves. The positioning of the trailing edge of the record card 12 with respect to the first pusher blade 38*a* is not critical in that the motion of the pusher blade 38*a* is sufficiently great so that it will engage at some time during its forward motion the trailing edge of the card and advance it to the proper distance. The only limitation upon the positioning is that the trailing edge of the record card 12 must be placed in the interspace between the first pusher blade 38*a* and the second pusher blade 38*b*.

Figure 3:
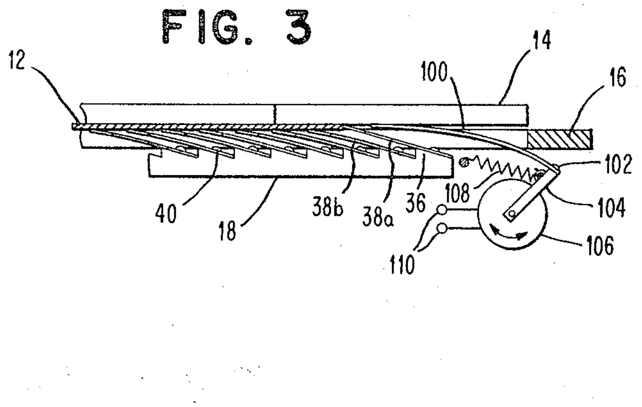
FIGURE 3 is a side view, highly simplified, of the record card advancing mechanism of FIGURE 1 showing the shield member in the withdrawn position with the first of the pusher blades engaging the trailing edge of the record card.

Due to the shield member 100 in its shielding position, as shown in FIGURE 1, it is not possible for the pusher blade 38*a* to contact the trailing edge of the record card 12 and cause advancement thereof. The record card 12 will remain in this idling condition until the associated operating station, which may be a summary punch mechanism, record card reader or the like provides an operating signal indicating the record card 12 in the record card advancing mechanism is required. The operating signal will be applied to input terminals 110 to cause the rotary solenoid 106 to operate and rotate its armature 104 in a clockwise direction. As the armature rotates, the shield member 100 will be withdrawn from its shielding position and placed in its unshielding position exposing the trailing edge of the record card 12 to the pusher blade 38*a*, as shown in FIGURE 3. Sometime during the forward movement of the pusher blade 38*a*, it will contact the trailing edge of the record card 12 (as shown in FIGURE 3) advancing it two record columns into the punch mechanism 52. The operating signal may now be removed from the input terminals 110 to allow the return to the shielding position of the shield member 100. However, at this time it will be ineffectual to prevent further contact between the trailing edge of the record card 12 and succeeding pusher blades 38*b*, 38*c* etc. If the shield member is long enough to shield more than the first pusher blade 38*a* this restoration of the shield member 100 would be delayed until all covered pusher blades have advanced the record card 12. Alternative restoration of the shield member 100 may be withheld until the record card advancing operation has been completed. The shield member 100 will be returned to the shielding position by the return spring 108 shown in FIGURE 3.

Once the forward motion of the pusher blade 38*a* has been completed, and the support member 18 begins its rearward motion, the pusher blade 38*a* will no longer control the motion of the record card. In addition during the first movement of the record card 12 into the punch mechanism 52, the record card 12 will be removed from contact with the spring restraining means 44 and thus the spring restraining means 44 will exert no further control over its position within the card advancing mechanism. The spring restraining means 50, however, will contact the record card during this step and each succeeding step until the record card has completely passed through the punch mechanism 52. The spring restraining means 50 will exert sufficient pressure upon the record card 12 forcing the record card 12 into contact with the upper guide member 14 and preventing unwanted forward motion of the record card which might exist had there been no restraining or limiting means. Thus, the forward movement of the record card 12 is limited both by the travel of the pusher blades 38 as well as by the restraining effect of the spring restraining members 50. During the rearward movement of the support member 18, the spring restraining means 50 will cause the record card 12 to be maintained in its forward position to prevent its movement with the support member 18 as it is moved away from the punch mechanism. In this manner, the trailing edge of the record card 12 will now be placed between the second pusher blade 38*b* and the third pusher blade 38*c* by the time that the support member 18 has moved to its limit position away from the punch mechanism 52. On the next forward motion of the support member 18, towards the punch mechanism 52 the pusher blade 38*b* will engage the trailing edge of the record card 12 and cause its advancement two further record columns. This procedure will continue for each operating cycle of the support 18. For each forward movement, the record card 12 will be advanced two record columns and for each rearward movement, the support member 18 will position the next succeeding pusher blade 38 adjacent the trailing edge of the record card 12. Once the record card 12 has been advanced completely out of the record advancing mechanism 10, a further record card 12 may be inserted therein.

While particular forms of the device have been shown and described, it is not intended to limit the scope of the invention to the particular forms disclosed herein, in that many alternative forms of the device will immediately be evident to those skilled in the art.

The embodiments of the invention in which an exclusive property or privilege is claimed are defined as follows:

1. In an apparatus for advancing material in a step-by-step manner to a succession of equally spaced positions comprising: a reciprocable material engaging means arranged to operatively engage the material in successive steps for repetitive advancing thereof when the material engaging means is moving in a direction of desired material advance; material guide means extending along the path of motion of said material engaging means and fixedly mounted with respect to said material engaging means to cause engagement of said material with said material engaging means; drive means coupled to said material engaging means to reciprocate said material engaging means; restraining means mounted in close proximity to said material engaging means acting to limit the amount of advance of said material in the desired direction of material advance and prevent movement of said material in a direction other than the direction of desired material advance; a movable shield means mounted intermediate said material and said material advancing means to prevent contact between said material and said material advancing means; translating means coupled to said shield means for selectively moving said shield means between a first position in which said shield means prevents contact between said material and said material advancing means and a second position in which said shield means permits contact between said material and said material advancing means; and control means coupled to said translating means to enable said shield means to be selectively moved to said first or second position.

2. An apparatus as defined in claim 1 further including feed means for initially placing said material in contact with said reciprocable material engaging means; and further control means placed adjacent said reciprocable material engaging means and said feed means for preventing said material from being moved in a direction opposite to the direction of desired material advance.

3. In a record card handling apparatus including a feed path over which record cards, having a plurality of lines, are to be advanced and an operating station, along said feed path, adapted to operate upon a predetermined number of lines of said record card per operation, a mechanism for the step-by-step advancing of a record card through said operating station to present said predetermined number of lines to said operating station for each step advance, comprising: a reciprocable record card engaging means arranged to operatively engage a record card in successive steps for repetitive advancing thereof when the record card engaging means is moving in a direction of desired record card advance; guiding means extending along the path of motion of said record card engaging means and fixedly mounted with respect to said record card engaging means to cause engagement of said record card with said record card engaging means; drive means coupled to said record card engaging means to reciprocate said record card engaging means; restraining means mounted in proximity to said record card engaging means acting to limit the amount of advance of said record card in the desired direction of record card advance and prevent movement of said record card in a direction other than the direction of desired record card advance; a movable shield means mounted intermediate said record card and said record card engaging means to prevent contact between said record card and said record card engaging means when in a first position and permit contact between said record card and said record card engaging means in a second position; translating means coupled to said shield means for selectively moving said shield means to said second position and return means coupled to said shield means to move said shield from said second position to said first position when said translating means is not activated.

4. An apparatus as defined in claim 3 further including feed means for initially placing said record cards in contact with said reciprocable record card engaging means; and further control means placed adjacent said reciprocable record card engaging means and said feed means for preventing said record cards from being moved in a direction opposite to the direction of desired record card advance.

5. In a record card handling apparatus, a device for advancing a record card in a step-by-step manner to a succession of equally spaced positions comprising: a support member having a plurality of equally spaced spring members coupled to and disposed in a line along the length of said support member, said spring members each having a free edge arranged to contact said record cards, said free edges being spaced apart by a distance equal to the desired equally spaced positions of said record card advance; a guide member extending along a portion of the path of advance of said record cards in said record card handling apparatus, and affixed thereto; drive means coupled to said support member to alternately move said support member in first and second opposite directions; restraining means mounted in close proximity to said spring members causing said record cards to engage said guide member to limit the amount of advance of said record cards when said support member is moved in a first direction and prevent movement of said record cards when said support member is moved in the second direction; a movable shielding means mounted intermediate said record cards and said record card advancing means to prevent contact between said record cards and said record card advancing means; translating means coupled to said shielding means for selectively moving said shielding means between a first position in which said shielding means prevents contact between said record cards and said record card advancing means and a second position in which said shielding means permits contact between said record cards and said record card advancing means, and further control means coupled to said translating means to selectively cause the movement of said shielding means to said first or second positions.

6. An apparatus as defined in claim 5 further including feed means for initially placing said record cards in contact with said spring members; and further control means placed adjacent said feed means for preventing said record cards from being moved in a direction opposite to the direction of desired record card advance.

7. In a record card handling apparatus, a device for advancing a record card in a step-by-step manner to a succession of equally spaced positions comprising: a support member having a plurality of equally spaced spring members coupled to and disposed along the length of said support member, said spring members each having a free edge, said free edges being spaced apart by a distance equal to the desired equally spaced positions of said record card advance; a guide member extending along a portion of the path of advance of said record cards in said record card handling apparatus; feeding means, mounted adjacent said support and guide members for inserting record cards between said guide member and the spring members in a position to cause the trailing edge of a record card to contact the free edge of the spring member closest to said feeding means, while the remaining portion of the record card is held against said guide means by the remaining spring members; drive means coupled to said support member to alternately move said support member in first and second opposite directions; first restraining means coupled mounted in close proximity to said spring members causing said record cards to contact said guide member to limit the amount of advance of said record cards when said support member is moved in a first direction and prevent movement of said record cards when said support member is moved in the second direction; second restraining means mounted in close proximity to said feeding means for preventing the movement of records out of said record card advancing device in a direction opposite that of desired record card advance; said first and second restraining means being insufficient to prevent record card advance when said support member is driven in said first direction whereby the record card will be advanced to one of said equally spaced positions by said first spring member when said support member is moved in said first direction and the trailing edge of said record card will be positioned adjacent the next spring member as said support member is moved in said second direction; a movable shielding means mounted intermediate said record cards and spring members to prevent contact between the trailing edge of said record card and the free edge of said first spring member whereby said record card is not advanced during the movement of said support member in said first direction; translating means coupled to said shielding means for selectively moving said shielding means between a first position in which said shielding means prevents contact between the trailing edge of said record cards and the free edges of said spring members and a second position in which said shielding means permits contact between the trailing edge of said record cards and the free edges of said spring members; and control means coupled to said translating means to selectively cause the movement of said shielding means to said first or second positions.

References Cited by the Examiner

UNITED STATES PATENTS

| | | | |
|---|---|---|---|
| 2,039,699 | 5/1936 | Biazzi | 271—54 |
| 2,280,823 | 4/1942 | Hansen | 271—55 |

M. HENSON WOOD, Jr., *Primary Examiner.*

J. N. ERLICH, *Assistant Examiner.*